United States Patent Office 3,170,948
Patented Feb. 23, 1965

3,170,948
PREPARATION OF DIALKYL CYANO-
VINYLAMINES
Everett Joseph Frazza, Yorktown Heights, N.Y., and
Lorence Rapoport, Stamford, Conn., assignors to American Cyanamid Company, Stamford, Conn., a corporation of Maine
No Drawing. Filed Jan. 18, 1963, Ser. No. 252,308
4 Claims. (Cl. 260—465.5)

This invention relates to dialkyl β-cyanovinylamines and their hydrochloride salts, and more particularly to the preparation thereof.

In accordance with this invention, dialkyl β-cyanovinylamines and the salts thereof are prepared by reacting a tertiary alkyl amine with β-chloroacrylonitrile. Although the actual course of the reaction is uncertain, it is reasonable to assume, without intent to so limit the invention, that it may be represented as follows:

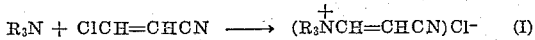

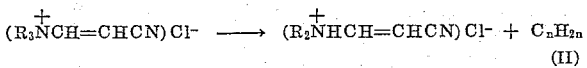

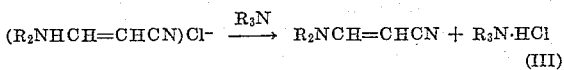

From the above, it can be seen that the β-cyanovinyl dialkylamine hydrochloride (II) is formed by the loss of an olefin from the quarternary halide (I) which is derived from the trialkylamine and β-chloroacrylonitrile. Neutralization of the amine hydrochloride (II) gives dialkyl-β-cyanovinylamine.

On completion of the reaction, which is conducted at elevated temperatures preferably above 40° C., the precipitated β-cyanovinyl dialkylamine hydrochloride (II) is separated by conventional means as by filtration. The precipitate may then be washed, dissolved in a suitable solvent and reprecipitated to obtain a purified β-cyanovinyl dialkylamine hydrochloride. Alternatively, the precipitated salt (II) may be treated in a conventional manner with an organic or an inorganic base to obtain the free β-cyanovinylamine (III). The liquid portion of the reaction medium remaining after separation of the hydrochloride (II) may be dissolved in ether, filtered, washed and dried, and then subjected to distillation to give additional free bases (III).

Various trialkylamines may be readily reacted with β-chloroacrylonitrile according to this invention to obtain a β-cyanovinylamine and/or its salt in good yield. Tertiary alkyl amines in which the alkyl group contains from 2 to 12 carbon atoms such as ethyl, n-propyl, isopropyl, butyl, isobutyl, sec-butyl, t-butyl, isoamyl, n-hexyl, 2-ethylhexyl, n-octyl, t-octyl, dodecyl and the like are illustrative of those which may be employed.

The process of this invention is readily conducted in the absence of a solvent and, as a practical matter, will generally be so conducted. However, if for some reason it is desirable to employ a solvent, any of the conventional materials, including water, generally employed in this capacity are suitable. Alcohols such as methanol; chlorinated aliphatic hydrocarbons such as carbon tetrachloride and trichlorethylene; aromatic hydrocarbons such as benzene and its homologues and their halogenated derivatives; amides such as dimethylformamide; esters such as ethyl acetate, ethers such as dioxane and the like may all be used.

The compounds formed by the process of this invention have various uses. For instance, they may be polymerized with other ethylenically unsaturated monomers containing a $CH_2=C<$ grouping to give copolymers containing basic centers. Copolymers of this nature find utility in the field of synthetic fibers when using acid dyes, as well as in other fields where basic centers in polymers are required such as in ion exchange resins, oil additives and the like.

Examples of monomers containing a $CH_2=C<$ grouping that can be copolymerized with the dialkyl β-cyanovinylamine prepared by the process of this invention are such monomers as vinyl aliphatic compounds, e.g., acrylonitrile, acrylamide, etc., and other compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and alkacrylamides, for instance N-methylol acrylamide, N-monoalkyl and -dialkyl acrylamides and methacrylamides, e.g., N-monoethyl, -ethyl, -propyl, -butyl, etc., and N-dimethyl, -ethyl, -propyl, -butyl, etc., acrylamides and methacrylamides, N-monoaryl and -diaryl acrylamides, and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenyl acrylic acid, etc., more particularly the alkyl esters of an acrylic acid, e.g., the methyl, ethyl, propyl, isopropyl, n-butyl, isobutyl, sec.-butyl, tert-butyl, amyl, hexyl, heptyl, octyl, decyl, dodecyl, etc., esters of acrylic, methacrylic, ethacrylic, phenylacrylic, etc., acids.

Any suitable means may be used in effecting polymerization of the dialkyl β-cyanovinylamine prepared by the process of this invention. Advantageously, a polymerization catalyst is employed, and the polymerization reaction is effected under non-aqueous conditions, that is, by known bulk-polymerization technique or while the monomers are dissolved or dispersed in an organic solvent or diluent, e.g., benzene, toluene, xylene, etc. The polymerization can be effected by batch, semi-continuous or continuous techniques, and at atmospheric or superatmospheric pressures.

In general, any of the polymerization catalysts which are suitable for use in polymerizing compounds containing an ethylenically unsaturated grouping, specifically a vinyl grouping, can be used. Particularly, useful are the so-called "free-radical" catalysts, of which benzoyl peroxide (a peroxy catalyst) and alpha,alpha'-azodiisobutyronitrile (an azo catalyst) are typical examples.

For additional examples of other monomers containing a $CH_2=C<$ grouping, copolymerizable with the dialkyl β-cyanovinylamines formed by the process of this invention, and various polymerization techniques, reference is made to United States Patent No. 3,001,974 issued September 26, 1961 to one of the applicants herein and John A. Price which discloses and claims copolymer compositions of β-cyanovinylamines and compounds containing a $CH_2=C<$ grouping and method of making the same.

Further, certain of the dialkyl β-cyanovinylamines formed by the process of this invention are disclosed and claimed in United States Patent No. 3,001,995, also issued September 26, 1961 to the applicants herein.

The disclosure of each of the hereinabove mentioned patents is incorporated herein by reference.

The following examples will further illustrate the present invention. All parts are by weight unless otherwise indicated.

EXAMPLE 1.—DIETHYL β-CYANOVINYLAMINE HYDROCHLORIDE

A solution comprising 0.2 mole each of β-chloroacrylonitrile and triethylamine is heated until vigorous boiling starts at 88° C. Heating is discontinued until boiling subsides after which heat is again applied for an additional 25 minutes during which time the mixture becomes semisolid. After cooling, the liquid portion is decanted and the solid washed repeatedly with acetone and ether. The light brown residue (15 g.) is dissolved in ethanol, decolorized, and reprecipitated with ether as fine off-white hydroscopic needles of diethyl β-cyanovinylamine hydrochloride. Calculated for $C_7H_{13}N_2Cl$: N, 17.44. Found: 17.46.

EXAMPLE 2.—DIETHYL β-CYANOVINYLAMINE $$NCCH=CHN(C_2H_5)_2$$

The liquid portion of the reaction medium of Example 1 is dissolved in ether, filtered, washed with water and dried over anhydrous magnesium sulfate. Distillation at reduced pressure gives 2.7 g. of the free base, diethyl β-cyanovinylamine.

EXAMPLE 3.—DI-n-PROPYL β-CYANOVIINYLAMINE

A flask containing a solution of 0.4 mole each of β-chloroacrylonitrile and tri-n-propylamine is immersed in a 75° C. oil bath and held there until an exothermic reaction commences and propylene is evolved. After the exotherm subsides, the mixture is heated for an additional 45 minutes, and cooled. The solid portion of the reaction mixture is filtered off, washed with acetone and ether and shaken with excess sodium carbonate solution. The oil which separates is extracted into ether and the ether solution washed with saturated sodium chloride solution and dried over anhydrous magnesium sulfate. Distillation gave 23 parts of di-n-propyl β-cyanovinylamine boiling at 115–117.3°/0.45 mm.; $n_D^{25}$ 1.5067.

EXAMPLE 4.—DI-n-BUTYL β-CYANOVINYLAMINE

The procedure of Example 3 is repeated except that tri-n-butylamine is employed in place of tri-n-propylamine to give di-n-butyl β-cyanovinylamine.

EXAMPLE 5.—PREPARATION OF A COPOLYMER OF ACRYLONITRILE AND DI-n-PROPYL β-CYANOVINYLAMINE (A) One hundred and eighty parts of acrylonitrile, 20 parts of di-n-propyl β-cyanovinylamine, 1800 parts of water, 390 parts of ethanol, and two parts of α,α-azodiisobutyronitrile as a polymerization catalyst are charged to a reaction vessel provided with a reflux condenser and are heated therein at the boiling temperature of the reaction mass for two hours. The resulting light tan-colored copolymer of acrylonitrile and di-n-propyl β-cyanovinylamine is collected on a Buchner funnel, washed first with 1000 parts of water and then with 1000 parts of methanol, after which it is air-dried to a constant weight.

(B) Fifty parts of acrylonitrile, 50 parts of di-n-propyl β-cyanovinylamine and one part of alpha,alpha'-azodiisobutyronitrile are heated together in a reaction vessel provided with a reflux condenser and kept on a steam bath for three hours. The resulting copolymer is slurried twice with two portions of 160 parts each of methanol, washed with ether, and then air-dried to a constant weight.

EXAMPLE 6

Samples of homopolymeric acrylonitrile and of the acrylonitrile copolymers of Examples 5A and 5B are subjected to the following dye test: A sample (5 parts) of the dry homopolymer or copolymer is added to a dye bath consisting of 500 parts of an aqueous solution containing 0.2 part of sulfuric acid, 1 part of sodium sulfate, and 0.2 part of Calcocid Alizarine Blue SAPG (Color Index No. 1054). The dye bath is boiled for thirty minutes, after which the polymerization product is filtered off and washed with hot water until the water is free of dye. The acrylonitrile copolymers of Examples 5A and 5B are dyed blue, whereas the homopolymeric acrylonitrile fails to absorb any dye, modifying an acrylonitrile polymerization product by replacing a part (e.g., from about 1% to about 30%) of the initial acrylonitrile with a dialkyl β-cyanovinylamine thereby to obtain a polymeric substance of improved dyeability, is therefore quite apparent. Such improvements in dye receptivity also prevail in the case of acrylonitrile copolymers containing higher percentage proportions of the aforementioned beta-cyanovinylamine, e.g., 50–75% or more by weight of the copolymer molecule.

This application is a continuation-in-part of our application Serial No. 704,882, filed December 24, 1957 and now abandoned.

While the foregoing invention has been described in conjunction with various preferred embodiments, it is to be understood that the invention is not to be solely limited thereto but is to be construed broadly and restricted only by the following appended claims.

We claim:

1. A method of preparing a member selected from the group consisting of dialkyl β-cyanovinylamines and the hydrochloride salts thereof which comprises reacting one mole of β-chloroacrylonitrile with one mole of a trialkylamine in which the alkyl radical contains from 2 to 12 carbon atoms, said reaction being a liquid phase reaction and being conducted at a temperature greater than about 40° C. whereby an olefin is evolved.

2. A method of forming a dialkyl β-cyanovinylamine hydrochloride which comprises reacting one mole of β-chloroacrylonitrile with one mole of trialkylamine in which the alkyl radical contains from 2 to 12 carbon atoms, said reaction being a liquid phase reaction and being conducted at a temperature greater than about 40° C., whereby an olefin is evolved and separating precipitated β-cyanovinylamine hydrochloride from the reaction mixture.

3. A method according to claim 2 in which a dialkyl β-cyanovinylamine is recovered from the liquid portion of the reaction mixture.

4. A method according to claim 2 in which the precipitated salt is neutralized to give the free base.

References Cited in the file of this patent
UNITED STATES PATENTS

| | | |
|---|---|---|
| 2,459,420 | Erickson | Jan. 18, 1949 |
| 3,001,974 | Frazza et al. | Sept. 26, 1961 |
| 3,001,995 | Frazza et al. | Sept. 26, 1961 |